(12) United States Patent
Hyun

(10) Patent No.: US 12,568,943 B2
(45) Date of Patent: Mar. 10, 2026

(54) FISHING REEL EQUIPPED WITH CONCEALMENT COVER FOR SIDE CONCEALMENT OF LEVEL WIND

(71) Applicant: DOYO ENGINEERING CO., LTD., Bucheon-city (KR)

(72) Inventor: Kang Ho Hyun, Bucheon-si (KR)

(73) Assignee: DOYO ENGINEERING CO., LTD., Bucheon-City (KR)

( * ) Notice: Subject to any disclaimer, the term of this patent is extended or adjusted under 35 U.S.C. 154(b) by 110 days.

(21) Appl. No.: 18/599,343

(22) Filed: Mar. 8, 2024

(65) Prior Publication Data

US 2024/0284888 A1 Aug. 29, 2024

Related U.S. Application Data

(63) Continuation of application No. PCT/KR2024/002490, filed on Feb. 27, 2024.

(30) Foreign Application Priority Data

Feb. 27, 2023 (KR) ........................ 10-2023-0025865

(51) Int. Cl.
*A01K 89/01* (2006.01)
*A01K 89/015* (2006.01)

(52) U.S. Cl.
CPC .... *A01K 89/0192* (2015.05); *A01K 89/01912* (2015.05)

(58) Field of Classification Search
CPC ..................... A01K 89/0192; A01K 89/01912
See application file for complete search history.

(56) References Cited

U.S. PATENT DOCUMENTS 4,750,684 A * 6/1988 Morimoto ............ A01K 89/015
242/310
5,308,019 A * 5/1994 Karlsson ............ A01K 89/0192
242/310

(Continued)

FOREIGN PATENT DOCUMENTS

CN 211881832 U * 11/2020
JP S61127476 U 8/1986

(Continued)

OTHER PUBLICATIONS

International Search Report—PCT/KR2024/002490 dated Jun. 17, 2024.

*Primary Examiner* — Emmanuel M Marcelo
(74) *Attorney, Agent, or Firm* — CANTOR COLBURN LLP

(57) ABSTRACT

Provided is a fishing reel equipped with a concealment cover for side concealment of a level wind. The fishing reel protects the level wind by covering an opening on each side of a level wind mounting portion with a dedicated concealment cover, and allows a user to decorate the fishing reel by changing the color of the concealment cover to suit the user's taste. To this end, the fishing reel includes a frame configured to have a concealment cover mounting portion provided between side cover mounting portions and a top cover mounting portion, and a concealment cover coupled to the concealment cover mounting portion and configured to cover an opening on each side of a level wind mounting portion.

6 Claims, 3 Drawing Sheets

(56) References Cited

U.S. PATENT DOCUMENTS

| | | | | | |
|---|---|---|---|---|---|
| 5,377,925 | A | * | 1/1995 | Miyazaki | ............. A01K 89/015 |
| | | | | | 242/312 |
| 6,016,982 | A | * | 1/2000 | Asano | .............. A01K 89/01916 |
| | | | | | 242/310 |
| 7,815,137 | B1 | * | 10/2010 | Kemp | .............. A01K 89/01912 |
| | | | | | 242/273 |
| 2013/0320125 | A1 | * | 12/2013 | Hyun | .............. A01K 89/01923 |
| | | | | | 242/312 |
| 2017/0013817 | A1 | * | 1/2017 | Hyun | .............. A01K 89/01121 |
| 2019/0124904 | A1 | * | 5/2019 | Hyun | .............. A01K 89/01912 |
| 2023/0101437 | A1 | * | 3/2023 | Hyun | .................... A01K 89/02 |
| | | | | | 242/223 |

FOREIGN PATENT DOCUMENTS

| | | | | | |
|---|---|---|---|---|---|
| JP | S6333780 | U | | 3/1988 | |
| JP | 10155401 | A | * | 6/1998 | ......... A01K 89/0192 |
| JP | H10155401 | A | * | 6/1998 | ......... A01K 89/0193 |
| JP | H11113461 | A | * | 4/1999 | ........... A01K 89/033 |
| JP | 2004187645 | A | | 7/2004 | |
| JP | 2014166151 | A | | 9/2014 | |
| JP | 2019076090 | A | | 5/2019 | |
| KR | 900010523 | Y1 | | 11/1990 | |
| KR | 20130037633 | A | * | 4/2013 | ........... A01K 89/015 |
| KR | 20170122087 | A | | 11/2017 | |
| KR | 20180006802 | A | * | 1/2018 | ....... A01K 89/01931 |
| KR | 20190039847 | A | * | 4/2019 | ........... A01K 89/015 |
| KR | 20190046280 | A | * | 5/2019 | ....... A01K 89/01912 |
| KR | 102083429 | B1 | | 3/2020 | |

* cited by examiner

FISHING REEL EQUIPPED WITH CONCEALMENT COVER FOR SIDE CONCEALMENT OF LEVEL WIND

TECHNICAL FIELD

The present disclosure relate to a fishing reel equipped with a concealment cover for side concealment of a level wind and, more particularly, to a fishing reel that protects a level wind by covering an opening on each side of a level wind mounting portion with a dedicated concealment cover, and allows a user to decorate the fishing reel by changing the color of the concealment cover to suit the user's taste.

BACKGROUND ART

Generally, fishing reels, and baitcasting reels in particular, differ only in the braking method depending on a spool brake system employed but are largely the same in that the reels consist of a frame on which a spool is mounted, a palm side cover coupled to one side of the frame, a gear side cover coupled to the other side of the frame, and a handle provided on the gear side cover.

Such fishing reels are provided with a guide hole at the front end of a frame through which a fishing line passes to guide the fishing line wound on a spool to the top of a fishing rod, and the guide hole is provided on a level wind that allows the fishing line to be wound evenly around the entire spool.

The level wind is installed transversely at the front end of the frame, and is coupled to a worm shaft with a two-way rail on the outer circumferential surface thereof, so that when the fishing line of the spool is unwound or wound, as the spool shaft and the worm shaft rotate together, the level wind moves left and right along the two-way rail in the longitudinal direction of the worm shaft, assisting in winding and unwinding the fishing line.

Such fishing reels are provided with a front cover that forms the front exterior of a fishing reel and protects a level wind at the rear from external shocks.

As can be seen in Korea Patent No. 10-2083429, etc., a front cover is detachably attached to a frame to facilitate maintenance of a fishing reel.

Meanwhile, a frame of a fishing reel has a top cover provided on the upper part of thereof to protect fingers of a user while making it easier for the user to hold the fishing reel. The top cover has a "⊏" shape with an opening at the rear, and is provided to cover a level wind at the front while opening the top of a spool.

However, due to the structure of the top cover, there is an opening between front ends of mounting portions on opposite sides of the frame and the top cover above the front ends of the mounting portions, and thus the level wind is exposed.

DISCLOSURE

Technical Problem

Accordingly, the present disclosure has been made keeping in mind the above problems occurring in the related art, and the present disclosure is intended to propose a fishing reel equipped with a concealment cover that protects a level wind by covering an opening on each side of a level wind mounting portion.

Technical Solution

In order to achieve the above objectives, according to an embodiment of the present disclosure, there is provided a fishing reel with a level wind, the fishing reel including: a frame configured to have a concealment cover mounting portion provided between side cover mounting portions and a top cover mounting portion; and a concealment cover coupled to the concealment cover mounting portion to cover an opening on each side of a level wind mounting portion.

In addition, in the fishing reel according to the present disclosure, the frame may include a bolt fastening hole formed in the concealment cover mounting portion, and the concealment cover may be provided with a first bolt fitting hole corresponding to the bolt fastening hole, so that the concealment cover may be coupled to the concealment cover mounting portion with a bolt.

In addition, the fishing reel according to the present disclosure may further include a top cover having a second bolt fitting hole arranged between the bolt fastening hole and the first bolt fitting hole, so that the top cover may be bolted to the concealment cover mounting portion together with the concealment cover.

In addition, in the fishing reel according to the present disclosure, the frame may include a protrusion coupling hole formed in the concealment cover mounting portion, and the concealment cover may include a coupling protrusion inserted into the protrusion coupling hole.

Advantageous Effects

According to a fishing reel of the present disclosure, a level wind can be protected by providing a concealment cover mounting portion between side cover mounting portions and a top cover mounting portion, and combining a concealment cover with the concealment cover mounting portion to cover an opening on each side of a level wind mounting portion, and users can customize the fishing reel to suit their taste by changing the colors of the concealment cover and a top cover. Furthermore, the concealment cover and the top cover are bolted together to facilitate disassembly and assembly, while allowing the concealment cover and the top cover to be more firmly attached to a frame, and the coupling force of the concealment cover, along with the coupling effect provided by a bolt, can be increased, and twisting can be prevented by adding a coupling protrusion to the concealment cover to fit-couple the concealment cover to the frame.

DESCRIPTION OF THE REFERENCE NUMERALS IN THE DRAWINGS

Figure 1:
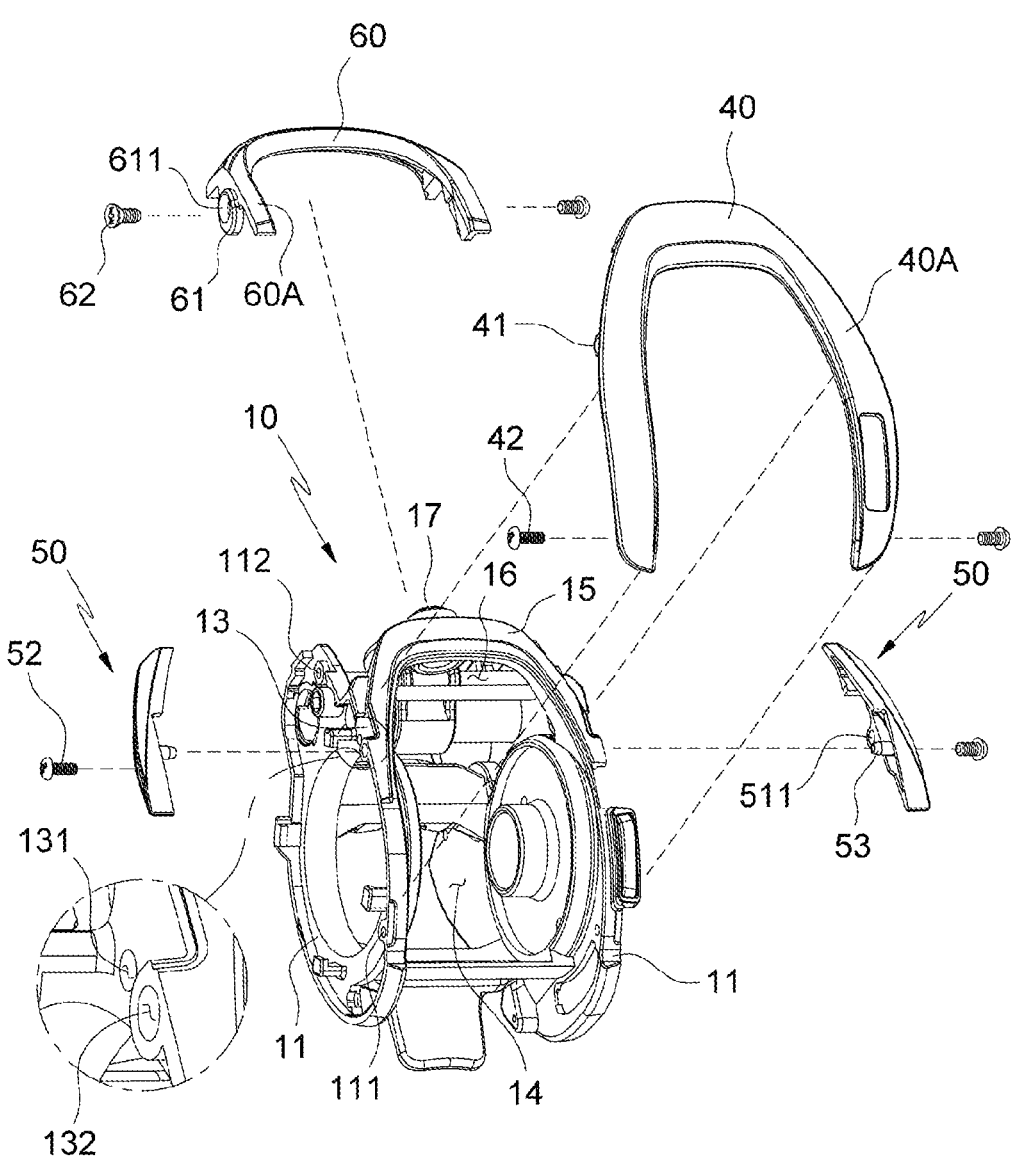
FIGS. 1 to 3 are exploded perspective views of main parts of a fishing reel according to the present disclosure.

10: frame
20, 30: side covers
40: top cover
50: concealment cover
60: front cover

BEST MODE

Since the present disclosure may be subject to various changes and may have various forms, aspects (or embodiments) thereof will be described in detail below. However, it should be understood that there is no intent to limit the present disclosure to the particular forms disclosed, but on the contrary, the present disclosure covers all modifications, equivalents, and alternatives falling within the spirit and scope of the present disclosure.

In each drawing, the same reference numerals, especially the tens and ones digits, or the same tens, ones and letters, indicate members having the same or similar functions, and unless otherwise specified, a member indicated by each reference numeral in the drawings may be regarded as a member that complies with these standards.

In addition, in each drawing, components are expressed exaggeratedly large (or thick), small (or thin), or simplified in size or thickness in consideration of convenience of understanding, etc., but the scope of protection of the present disclosure should not be construed as limited thereby.

The terms used in the present specification are merely used to describe specific aspects (or embodiments), and are not intended to limit the present disclosure. The singular expression includes the plural expression unless the context clearly dictates otherwise.

It should be understood that in the present disclosure, terms such as "comprise (include)" or "have" are intended to designate that a feature, number, step, operation, component, part, or combination thereof described in the specification exists, and do not preclude the possibility of addition or existence of one or more other features or numbers, steps, operations, components, parts, or combinations thereof.

Unless otherwise defined, all terms used herein, including technical or scientific terms, have the same meaning as commonly understood by a person skilled in the art. Terms such as those defined in the commonly used dictionaries should be construed as having meanings consistent with the meanings in the context of the related art and shall not be construed in ideal or excessively formal meanings unless expressly defined in this application.

Terms such as ~first~, ~second~, etc. used in this specification are only used to distinguish different components and are not limited by the order in which they were manufactured, and the names may not match in the detailed description and claims of the present disclosure.

In describing a fishing reel according to the present disclosure, for convenience, an approximate, non-strict direction standard will be specified with reference to FIG. 1. The direction in which gravity acts is downward, and up, down, left, and right are determined as shown, and in the detailed description related to other drawings and claims of the present disclosure, unless otherwise specified, the direction is specified and described according to this standard.

Hereinafter, a fishing reel according to the present disclosure will be described with reference to the attached drawings.

Figure 2:
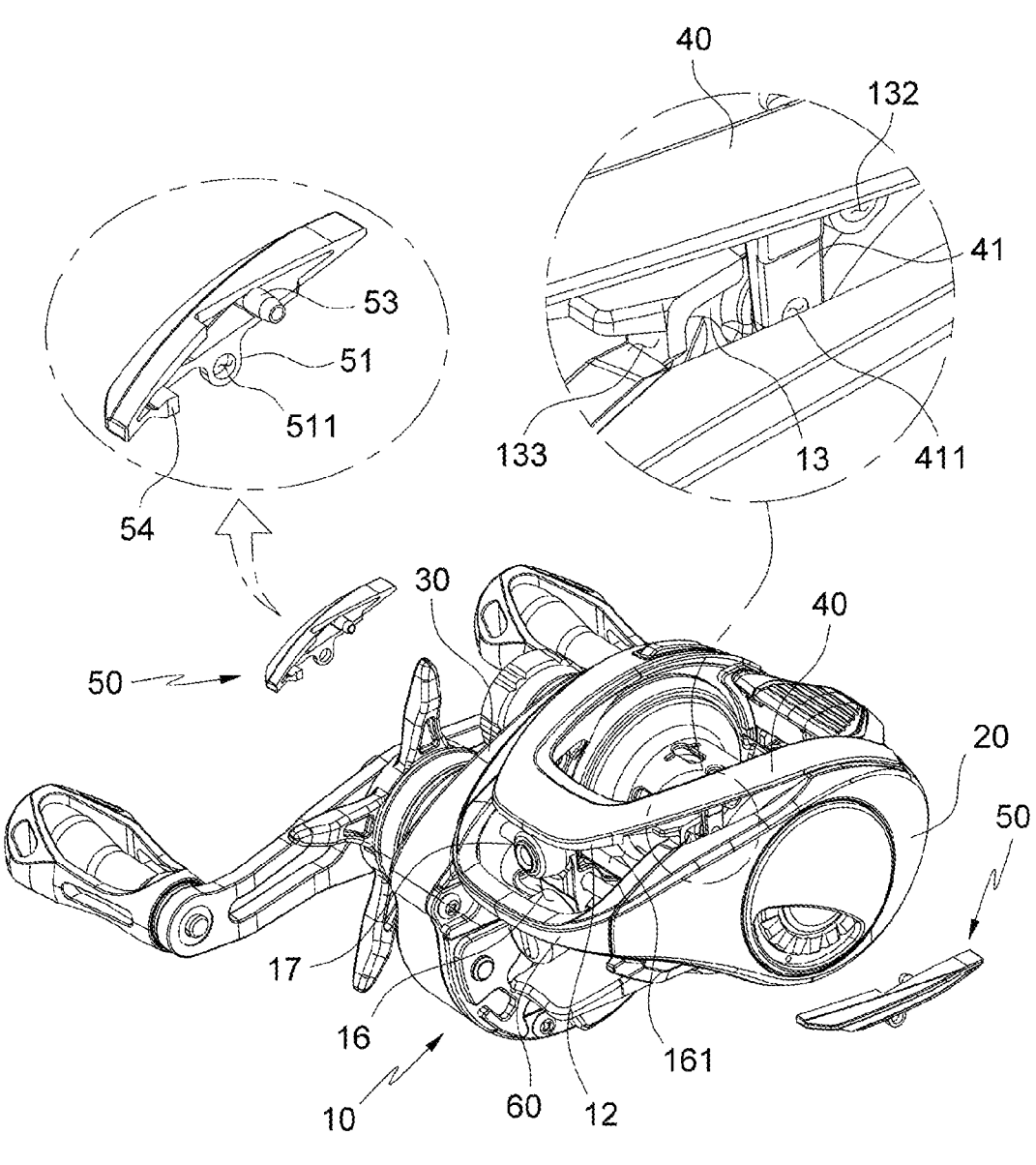
Figure 3:
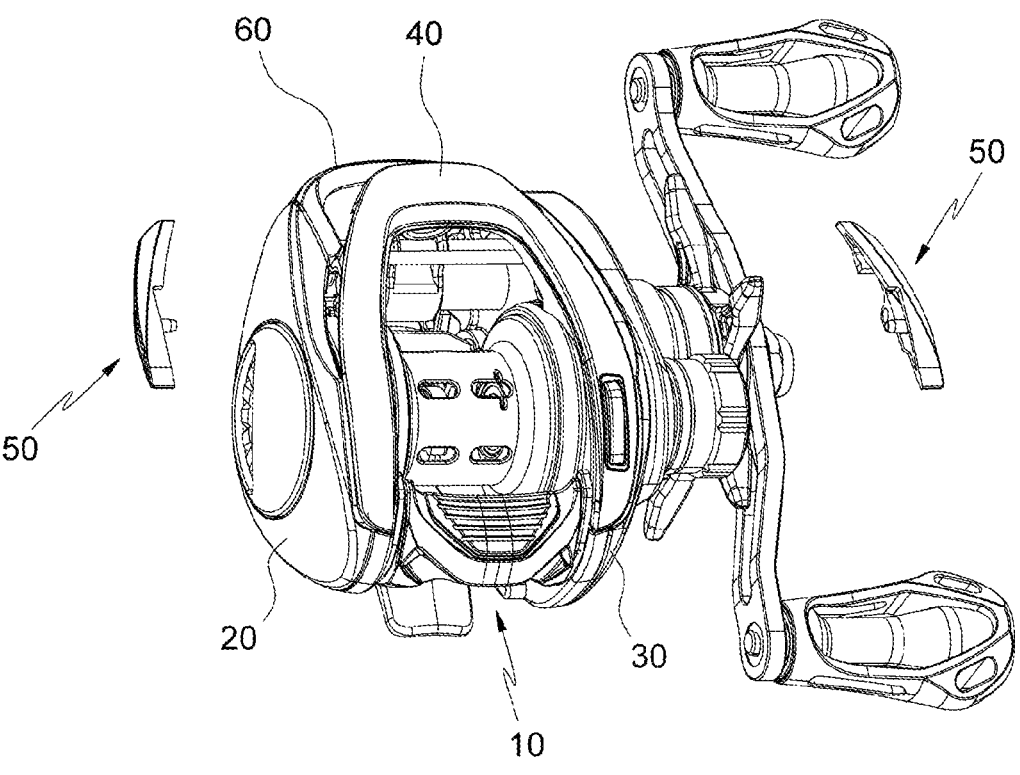

The present disclosure relates to a fishing reel, especially a baitcasting reel, and as shown in FIGS. 1 to 3, includes a frame 10, side covers 20 and 30, a top cover 40, a concealment cover 50, and a front cover 60.

In addition to the above components, the remaining basic components of the fishing reel, such as a handle, are known, and detailed descriptions thereof are omitted for convenience of understanding.

The present disclosure includes: the frame 10 having a concealment cover mounting portion 13 provided between side cover mounting portions 11 and a top cover mounting portion 12; and the concealment cover 50 coupled to the concealment cover mounting portion 13 and covering an opening 161 on each side of a level wind mounting portion 16.

In the frame 10, the side cover mounting portions 11 are provided in a planar structure on opposite sides of a spool mounting portion 14 in the center of the frame 10, a front cover mounting portion 15 is formed to be connected from a front end of the side cover mounting portion 11 to a front end of the opposite side cover mounting portion 11 so that the level wind mounting portion 16, which is a space open at the top and bottom, is formed between the top cover mounting portion 12 and the spool mounting portion 14, and the front cover 60 is coupled to the front cover mounting portion 15.

In addition, in the frame 10, the top cover mounting portion 12 is formed to extend upward, in a similar shape to the front cover mounting portion 15, from the upper surface of each rear end of the side cover mounting portions 11 toward the top of the level wind mounting portion 16 so that an opening 161 of the level wind mounting portion 16, which is an empty space, is created between the side cover mounting portions 11 and the top cover mounting portion 12, and the top cover 40 is mounted on the upper surface of the top cover mounting portion 12.

Between the side cover mounting portions 11 and the top cover mounting portion 12, parts of the opening 161 of the level wind mounting portion 16 are connected in a planar shape to form the concealment cover mounting portion 13.

The frame 10 includes a first bolt fastening hole 131 formed in the concealment cover mounting portion 13, and the concealment cover 50 has a first bolt fitting hole 511 corresponding to the first bolt fastening hole 131, so that the concealment cover 50 is coupled to the concealment cover mounting portion 13 with a first bolt 52.

In addition, the frame 10 includes a protrusion coupling hole 132 formed in the concealment cover mounting portion 13, and the concealment cover 50 includes a coupling protrusion 53 fitted into the protrusion coupling hole 132.

The first bolt fastening hole 131 and the protrusion coupling hole 132 are arranged back and forth and are formed at heights that are offset from each other up and down.

The first bolt fitting hole 511 is formed in a first coupling portion 51 protruding from the bottom of the middle portion of the concealment cover 50, and the coupling protrusion 53 protrudes from the inner surface of the concealment cover 50 to a predetermined length.

In addition, the frame 10 includes a locking groove 133 formed on the front side of the concealment cover mounting portion 13, and the concealment cover 50 further includes a locking protrusion 54 fitted into the locking groove 133.

The locking groove 133 has a shape in which the front and both left and right sides are opened by a protruding structure connected to the outer surface of the concealment cover mounting portion 13.

The locking protrusion 54 is formed by bending and connecting from the front end of the concealment cover 50 to the rear side.

The top cover 40 is provided with a second bolt fitting hole 411 arranged between the first bolt fastening hole 131 and the first bolt fitting hole 511, so that the top cover 40 is coupled to the concealment cover mounting portion 13 with the first bolt 52 together with the concealment cover 50.

The second bolt fitting hole 411 is provided in a second coupling portion 41 protruding from the bottom of the middle part of wings 40A of the top cover 40 in a shape corresponding to the first coupling portion 51.

Thus, when the top cover 40 is seated on the top cover mounting portion 12 and the concealment cover 50 is inserted into the concealment cover mounting portion 13, as the coupling protrusion 53 is inserted into the protrusion coupling hole 132, the first bolt fitting hole 511, the second bolt fitting hole 411, and the first bolt fastening hole 131 are aligned on the same line on the left and right.

When the first bolt 52 is passed through the second bolt fitting hole 411 and the first bolt fitting hole 511 and tightened into the first bolt fastening hole 131, the top cover 40 and the concealment cover 50 are coupled to the frame 10 by the first bolt 52.

Furthermore, the frame 10 has a second bolt fastening hole 111 formed on the outer surface of the rear end of the side cover mounting portions 11, and the top cover 40 has the third bolt fitting hole formed in the third coupling portion protruding from the bottom of the rear end of the wings 40A, so that as a second bolt 42 passes through the third bolt fitting hole and is fastened to the second bolt fastening hole 111, the top cover 40 is seated and coupled to the top cover mounting portion 12.

Meanwhile, the front cover 60 is provided with a connecting piece 60A that is bent backwards at each of left and right ends of the front cover 60 and extended, and the connecting pieces 60A on opposite sides are coupled in contact with the front part of the frame 10, more precisely, the upper surface of the front cover mounting portion 15.

In addition, the frame 10 has a third bolt fastening hole 112 formed on the outer surface of the front end of the side cover mounting portions 11, and the front cover 60 has a fourth coupling portion 61 provided with a fourth bolt fitting hole 611 corresponding to the third bolt fastening hole 112, which protrudes below the front end of the connecting piece 60A, so that after inserting the front cover 60 into the front cover mounting portion 15, a third bolt 62 may be inserted into the fourth bolt fitting hole 611 to be screwed into the third bolt fastening hole 112.

In the above description of the present disclosure, although a fishing reel was mainly described with reference to the attached drawings, the present disclosure is capable of various modifications, changes, and substitutions by those skilled in the art, and such modifications, changes, and substitutions should be construed as falling within the scope of protection of the present disclosure.

The invention claimed is:

1. A fishing reel comprising:
a side cover mounting portion formed in a planar structure on each side of a spool mounting portion in a center of a frame;
a front cover mounting portion formed to be connected from a front end of the side cover mounting portion to a front end of an opposite side cover mounting portion so that a level wind mounting portion is formed between a top cover mounting portion and the spool mounting portion, the level wind mounting portion being a space open at a top and bottom thereof;
a front cover coupled to the front cover mounting portion, wherein the top cover mounting portion is formed to extend upward from an upper surface of a rear end of each side cover mounting portion toward a top of the level wind mounting portion in a corresponding shape to the front cover mounting portion so that an opening of the level wind mounting portion is created between the side cover mounting portion and the top cover mounting portion, the opening being an empty space;

a top cover mounted on an upper surface of the top cover mounting portion; and
a concealment cover coupled to a concealment cover mounting portion formed in the frame to cover the opening on each side of the level wind mounting portion,
wherein the frame includes a first bolt fastening hole formed in the concealment cover mounting portion,
the concealment cover is provided with a first bolt fitting hole corresponding to the first bolt fastening hole, and
the top cover includes a second bolt fitting hole arranged between the first bolt fastening hole and the first bolt fitting hole so that the top cover and the concealment cover are coupled to the concealment cover mounting portion by a first bolt, and
wherein the first bolt fitting hole is formed in a first coupling portion protruding from a bottom of a middle portion of the concealment cover, and the second bolt fitting hole is provided in a second coupling portion protruding from a bottom of a middle portion of wings of the top cover in a shape corresponding to the first coupling portion.

2. The fishing reel of claim 1, wherein the frame includes a protrusion coupling hole formed in the concealment cover mounting portion, and
the concealment cover includes a coupling protrusion inserted into the protrusion coupling hole.

3. The fishing reel of claim 2, wherein the frame includes a locking groove formed on a front side of the concealment cover mounting portion, and
the concealment cover further includes a locking protrusion fitted into the locking groove.

4. The fishing reel of claim 3, wherein the frame has a second bolt fastening hole formed on an outer surface of the rear end of each side cover mounting portion, and
the top cover has a third bolt fitting hole formed in a third coupling portion protruding from a bottom of a rear end of the wings, so that as a second bolt passes through the third bolt fitting hole and is fastened to the second bolt fastening hole, the top cover is seated and coupled to the top cover mounting portion.

5. The fishing reel of claim 2, wherein the frame has a second bolt fastening hole formed on an outer surface of the rear end of each side cover mounting portion, and
the top cover has a third bolt fitting hole formed in a third coupling portion protruding from a bottom of a rear end of the wings, so that as a second bolt passes through the third bolt fitting hole and is fastened to the second bolt fastening hole, the top cover is seated and coupled to the top cover mounting portion.

6. The fishing reel of claim 1, wherein the frame has a second bolt fastening hole formed on an outer surface of the rear end of each side cover mounting portion, and
the top cover has a third bolt fitting hole formed in a third coupling portion protruding from a bottom of a rear end of the wings, so that as a second bolt passes through the third bolt fitting hole and is fastened to the second bolt fastening hole, the top cover is seated and coupled to the top cover mounting portion.

* * * * *